(12) United States Patent
Bae

(10) Patent No.: US 12,030,744 B2
(45) Date of Patent: Jul. 9, 2024

(54) CABLE-BRAKING APPARATUS

(71) Applicant: HUMAN NT CO., LTD., Gyeonggi-do (KR)

(72) Inventor: Hoo Geun Bae, Incheon (KR)

(73) Assignee: HUMAN NT CO., LTD., Gyeonggi-Do (KR)

( * ) Notice: Subject to any disclaimer, the term of this patent is extended or adjusted under 35 U.S.C. 154(b) by 160 days.

(21) Appl. No.: 17/506,256

(22) Filed: Oct. 20, 2021

(65) Prior Publication Data

US 2022/0119226 A1 Apr. 21, 2022

(30) Foreign Application Priority Data

Oct. 20, 2020 (KR) .......................... 10-2020-0135943

(51) Int. Cl.
*B66B 5/18* (2006.01)
*F16D 63/00* (2006.01)

(52) U.S. Cl.
CPC ............ *B66B 5/185* (2013.01); *F16D 63/008* (2013.01)

(58) Field of Classification Search
CPC .. B66B 5/185; B66B 5/02; B66B 5/04; B66D 5/16; F16D 63/008
See application file for complete search history.

(56) References Cited

U.S. PATENT DOCUMENTS

| | | | | |
|---|---|---|---|---|
| 5,228,540 A * | 7/1993 | Glaser | ....................... | B66B 5/04 187/373 |
| 5,966,994 A * | 10/1999 | Woo | ....................... | G05G 5/18 74/513 |
| 8,973,717 B2 * | 3/2015 | Bae | ....................... | B66D 5/16 188/188 |
| 2006/0118366 A1 * | 6/2006 | Eckenstein | ............. | B66B 5/185 188/161 |
| 2009/0294220 A1 * | 12/2009 | Glaser | ..................... | B66B 5/185 187/350 |
| 2013/0140113 A1 * | 6/2013 | Bae | ....................... | B66B 5/185 188/65.1 |
| 2020/0122969 A1 * | 4/2020 | Varon | ..................... | F16H 25/20 |

FOREIGN PATENT DOCUMENTS

KR 101011024 1/2011

OTHER PUBLICATIONS

WO 2020096397 A1 (Year: 2020).*
DE 102018212172 A1 (Year: 2019).*

* cited by examiner

*Primary Examiner* — Robert A. Siconolfi
*Assistant Examiner* — Mahbubur Rashid
(74) *Attorney, Agent, or Firm* — IPLA P.A.

(57) ABSTRACT

A cable-braking apparatus includes a main body unit at which a main cable is positioned, a drive unit provided at the main body unit so as to generate a drive force, an elastic compression unit configured to compress or release the main elastic element using the drive force generated by the drive unit, a press unit actuated by the elastic compression unit so as to move a press plate thereof to thus press the main cable, and a movement control unit configured to lock or release an anchor pin to thus control movement of the press unit. The main elastic elements are compressed and released by the action of the gear train and the clutch, thereby offering an effect of preventing malfunctions.

4 Claims, 13 Drawing Sheets

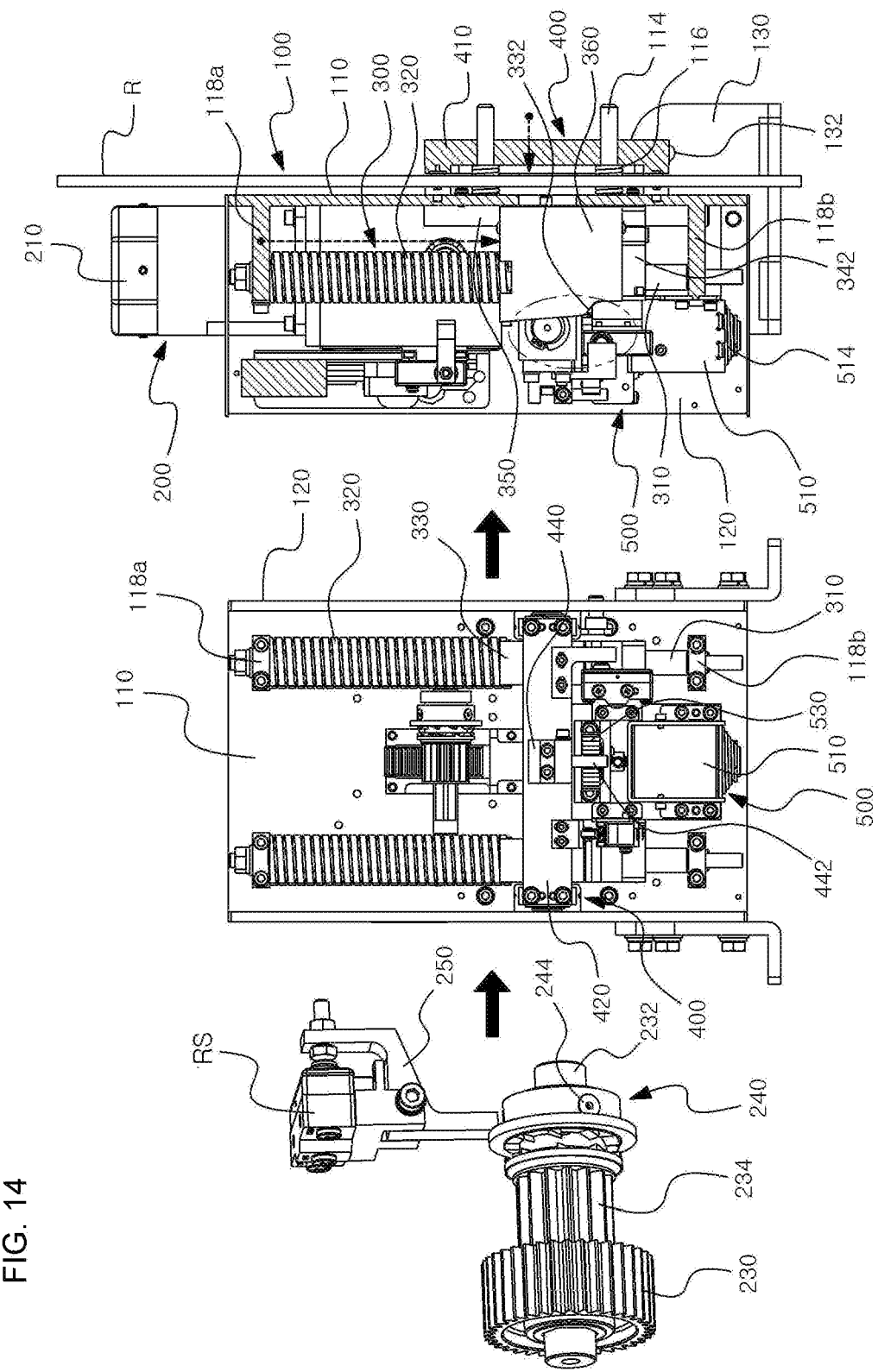

CABLE-BRAKING APPARATUS

BACKGROUND

The present invention relates to a cable-braking apparatus, and more particularly to a cable-braking apparatus configured to press a main cable to thus stop an elevator in case of emergency operation of the elevator.

Generally, an elevator, which is an apparatus configured to transfer people or objects to desired positions, is constructed such that a lift is connected to a hoist via a main cable and is lifted and lowered along guide rails through a hoistway, which is vertically formed through a building.

The elevator is provided with a braking apparatus configured to brake a lift in case of emergency. The braking apparatus is configured to be actuated using hydraulic pressure, pneumatic pressure, or an elastic force of a spring.

Technology relating to such a braking apparatus is disclosed in Korea patent registration publication No. 1011024.

However, the patent document exposes a problem whereby locking force is limited because the locking is achieved only by a procedure of coupling a mounting hole in a coupling block to a connecting rod.

Patent Document 1: Korea Patent Registration Publication No. 1011024 (2011.01.19)

SUMMARY OF THE INVENTION

Therefore, the present invention has been made in view of the above problems, and it is an object of the present invention to provide a cable-braking apparatus in which the locked state of an anchor pin block is released and thus a cable is pressed by a press plate in an emergency state although the locked state is maintained in a normal state, whereby the locked state is maintained by the dual action of an anchor pin and a connecting rod and in which main elastic elements are compressed and released by the action of a gear train and a clutch, thereby offering an effect of preventing malfunctions.

In accordance with the present invention, the above and other objects can be accomplished by the provision of a cable-braking apparatus including a main body unit at one side of which a main cable is positioned, a drive unit, which is provided at another side of the main body unit so as to generate a drive force, an elastic compression unit, configured to compress or release main elastic elements using the drive force generated by the drive unit, a press unit, which is actuated by the elastic compression unit so as to move a press plate thereof, which is provided at one side thereof, to thus press the main cable, and a movement control unit configured to lock or release an anchor pin, which is provided at another side of the press unit, to thus control the movement of the press unit.

The drive unit may include a drive motor configured to provide rotative force in a longitudinal direction, a follower shaft configured to convert the longitudinal rotative force from the drive motor into crosswise rotative force via a gear train, and a clutch provided at an end of the follower shaft, the press plate being separated from the main cable when the clutch is rotated in the same direction as the rotational direction of the follower shaft and pressing the main cable when the clutch is rotated in the direction opposite the rotational direction of the follower shaft.

The elastic compression unit may include a pair of guide rods disposed at another side of the main body unit so as to be erect, the main elastic elements, which are respectively fitted over the pair of guide rods, coupling blocks, through which the pair of guide rods respectively extend and which are respectively fixed to the main elastic elements, the coupling blocks being moved vertically to positions for opening and closing the press plate by the main elastic elements, and a rack, which is positioned between the pair of guide rods and which is moved by the drive unit so as to compress the main elastic elements.

The press unit may include a press plate, which is positioned behind the main body unit so as to press or release the main cable, an anchor pin block, which is spaced forwards apart from the press plate and which includes an anchor pin which is locked in or released from a lock of the movement control unit, and a connecting rod, which is rotatably provided between the anchor pin block and the press plate and which is engaged with a stepped portion formed at a coupling block of the elastic compression unit so as to limit the positional range within which the main elastic elements are compressed.

The movement control unit may include a solenoid, which is positioned below an anchor pin block of the press unit and a pin cover of which is raised upon application of power and is lowered by restoring force on interruption of application of power, a lock, which is disposed above the solenoid and is divided into a pair of segments, the lock being configured such that first ends of the segments are opened or closed so as to cause locking grooves, which are formed in second ends of the segments, to hold or release the anchor pin of the anchor pin block when the pin cover is raised or lowered, and a tension spring, which is provided below the lock so as to provide the lock with restoring force.

BRIEF DESCRIPTION OF THE DRAWINGS

The above and other objects, features and other advantages of the present invention will be more clearly understood from the following detailed description taken in conjunction with the accompanying drawings, in which:

FIG. 14 is a schematic view more specifically illustrating operation of the press plate and operation of the clutch in the opened state of the press plate by the drive unit of the cable-braking apparatus according to the present invention.

DETAILED DESCRIPTION OF THE INVENTION

Figure 1:
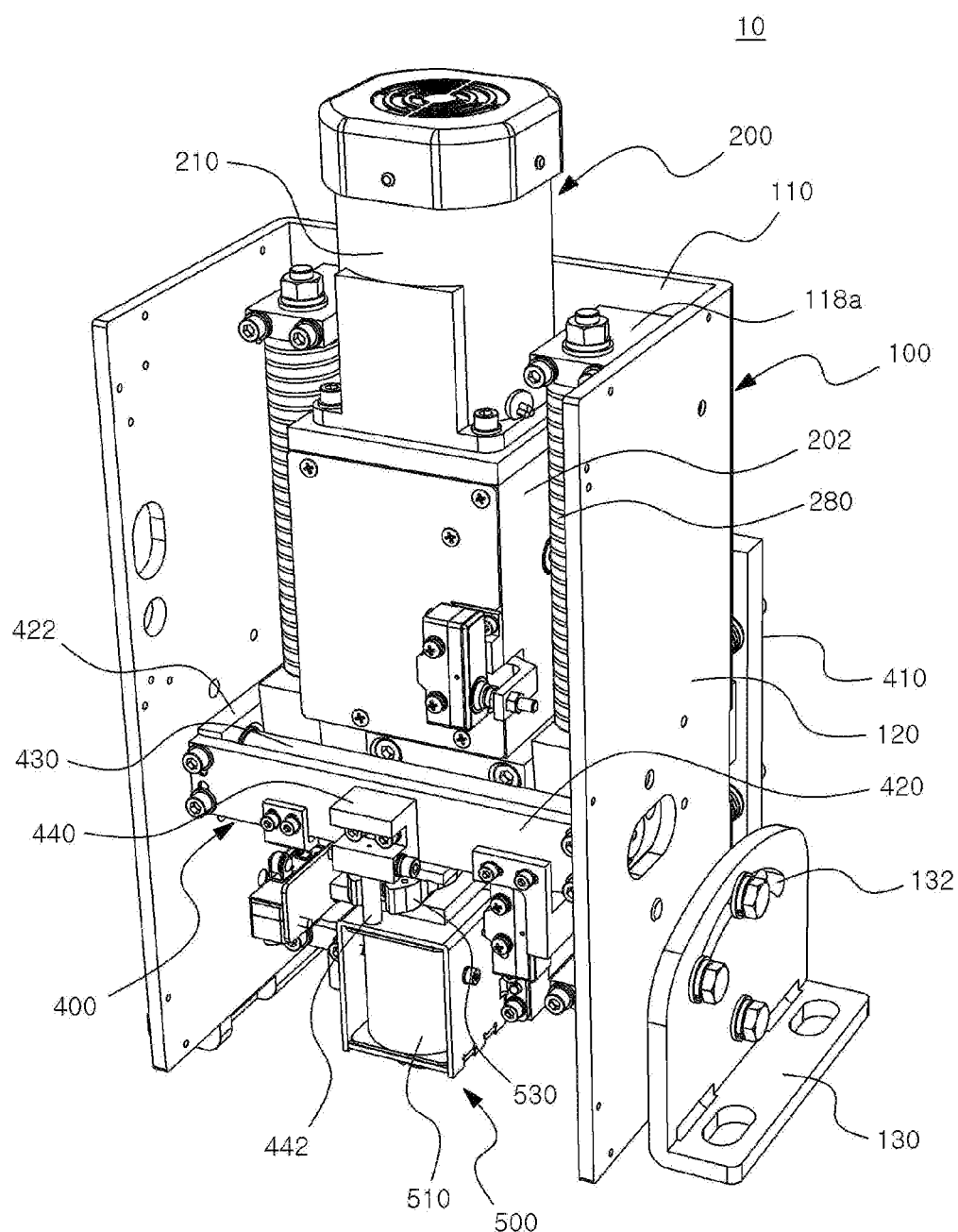
FIG. 1 is a perspective view illustrating the cable-braking apparatus according to the present invention.
Figure 2:
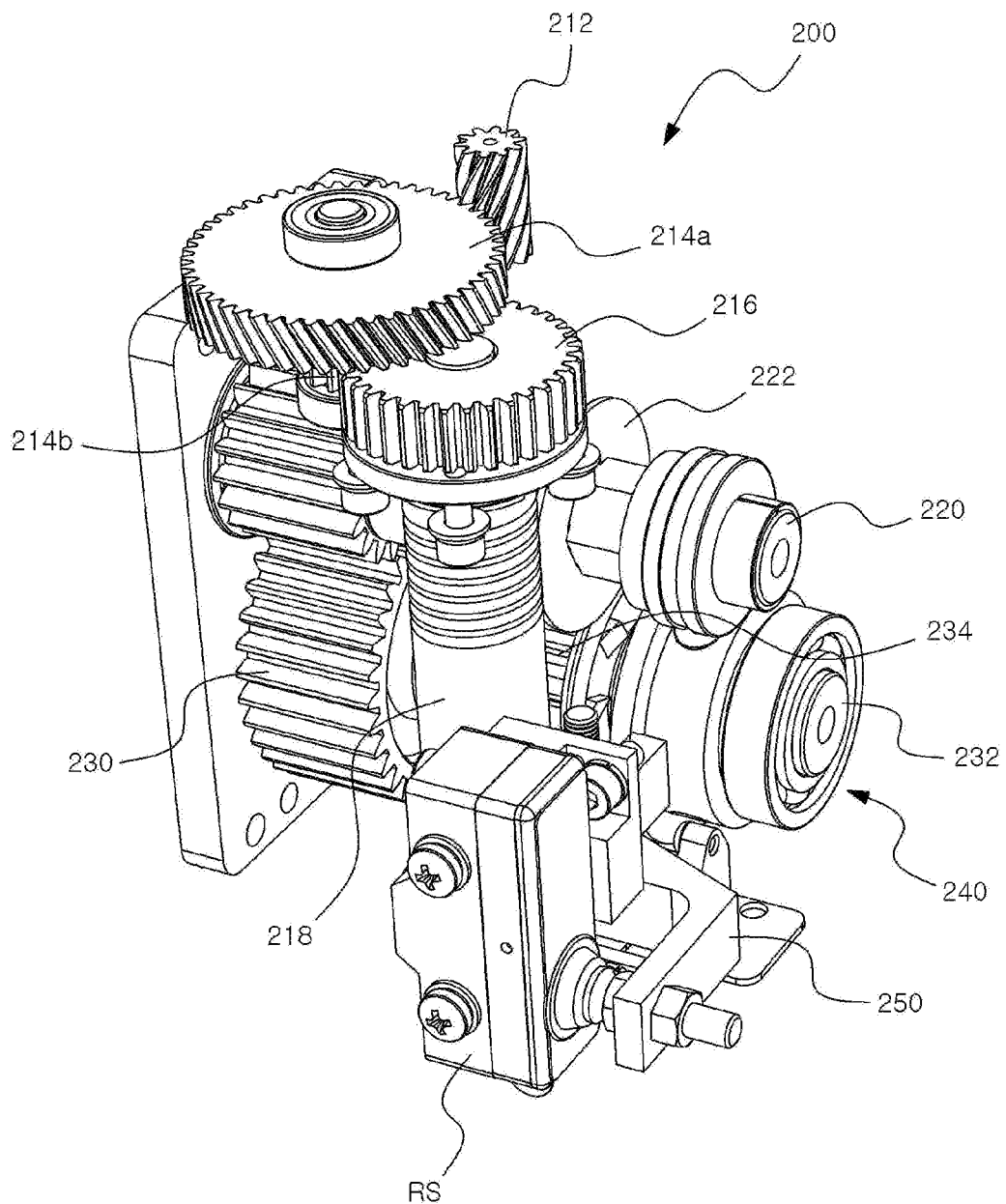
FIG. 2 is a perspective view illustrating a drive unit of the cable-braking apparatus according to the present invention.
Figure 3:
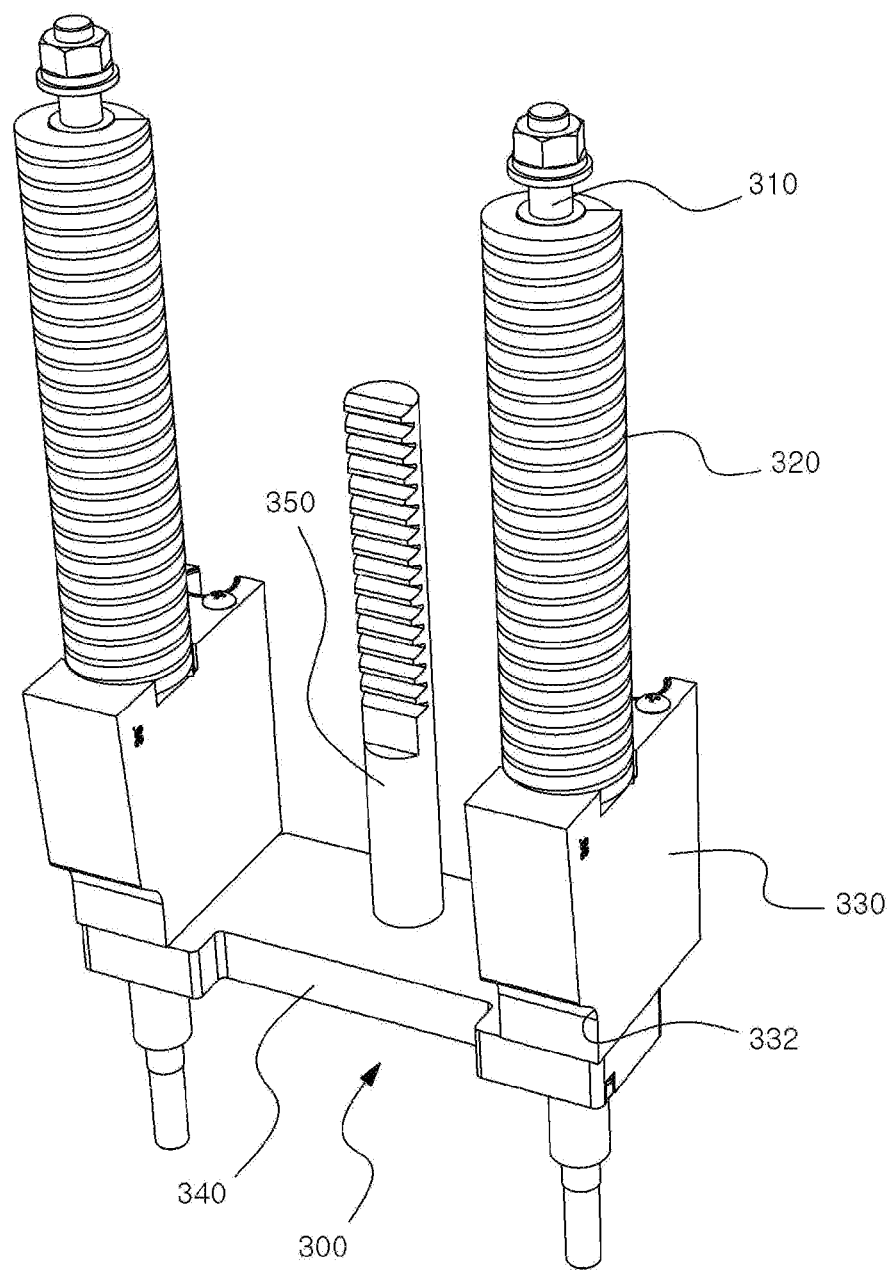
FIG. 3 is a perspective view illustrating an elastic compression unit of the cable-braking apparatus according to the present invention.
Figure 4:
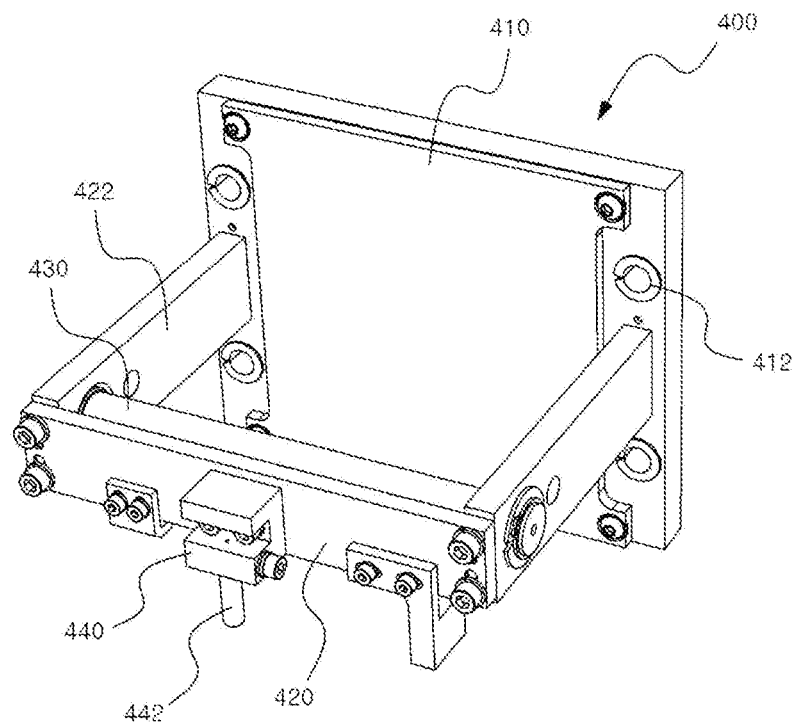
FIG. 4 is a perspective view illustrating a press unit of the cable-braking apparatus according to the present invention.
Figure 5:
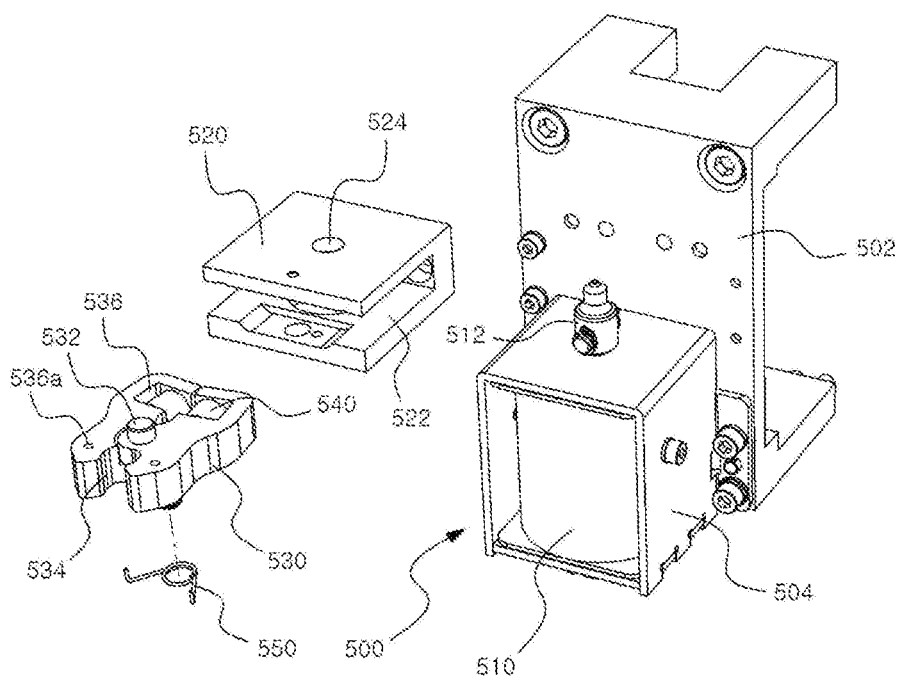
FIG. 5 is an exploded perspective view illustrating a movement control unit of the cable-braking apparatus according to the present invention.
Figure 6:
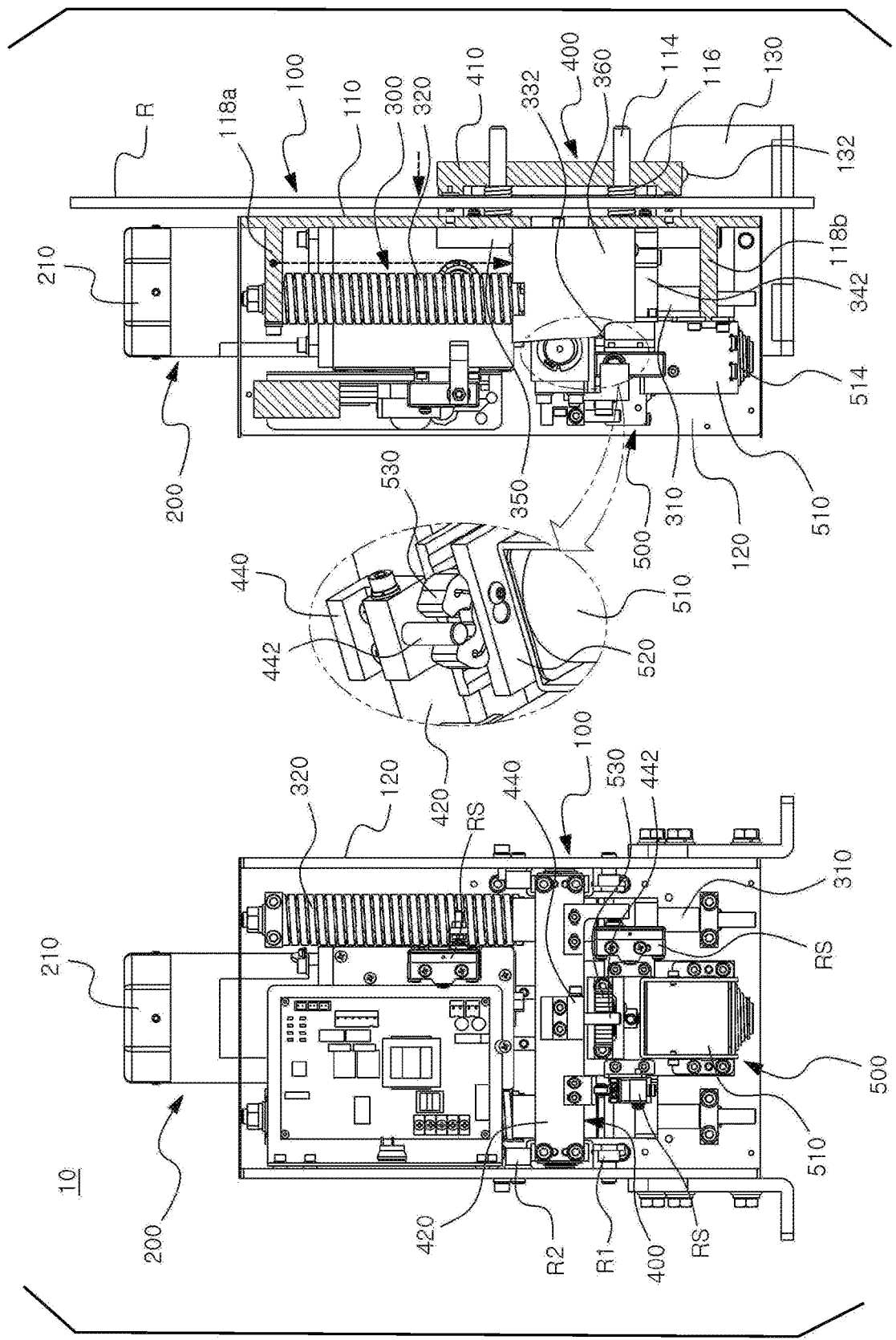
FIG. 6 is a schematic view illustrating an operation of a press plate of the cable-braking apparatus according to the present invention.
Figure 7:
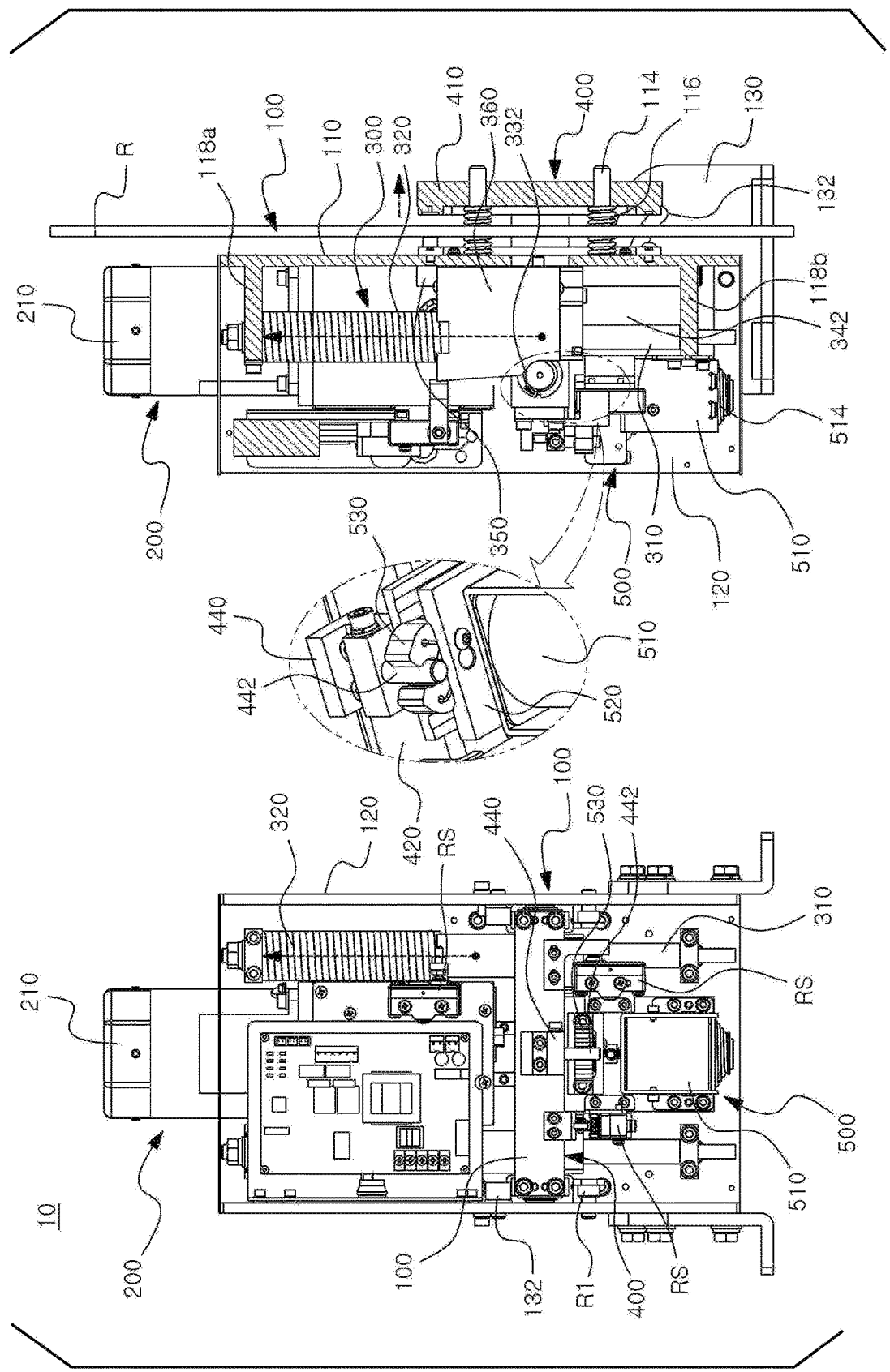
FIG. 7 is a schematic view illustrating the opened state of the press plate of the cable-braking apparatus according to the present invention.
Figure 8:
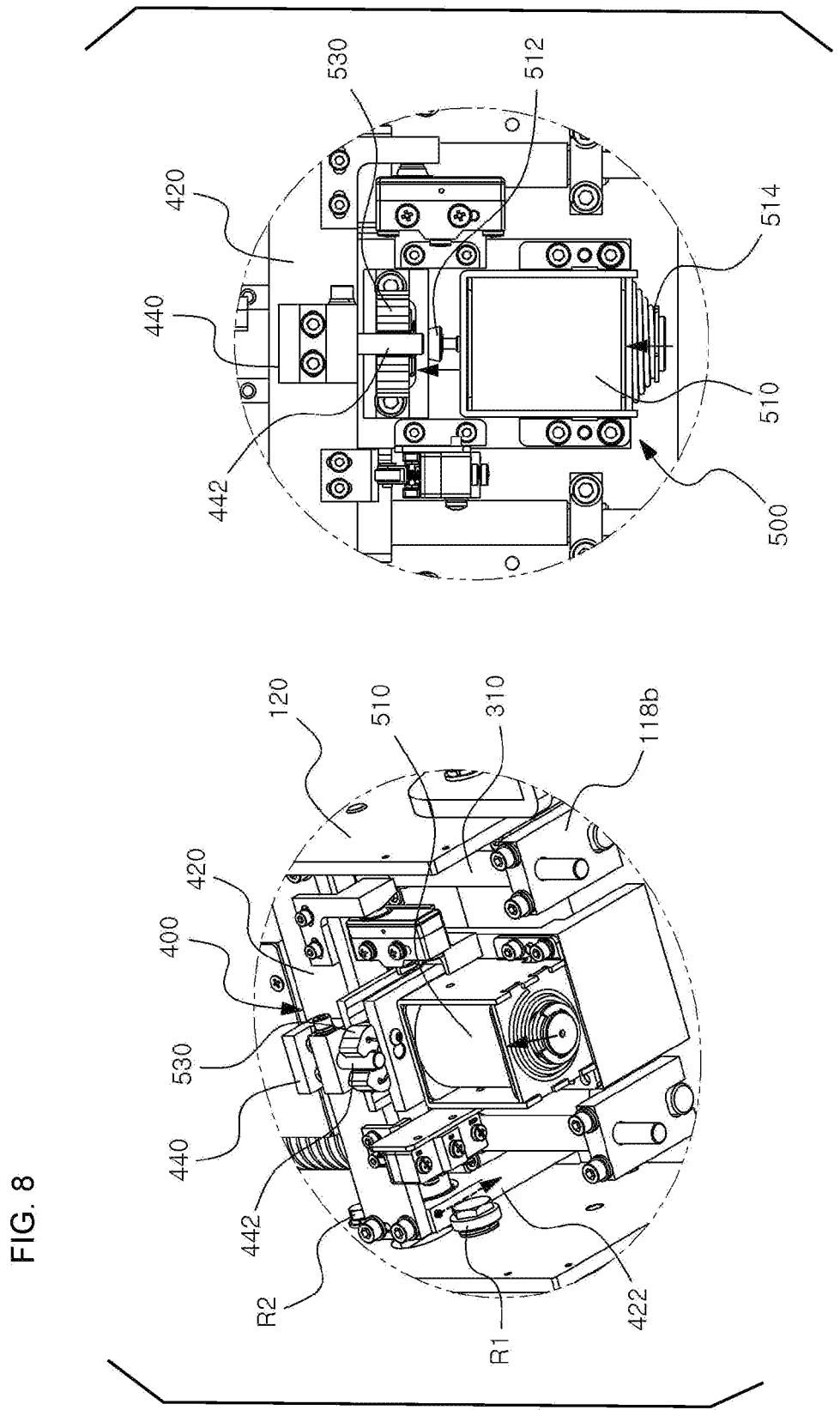
FIG. 8 is a schematic view illustrating the locked state of an anchor pin during the operation of the press plate of the cable-braking apparatus according to the present invention.
Figure 9:
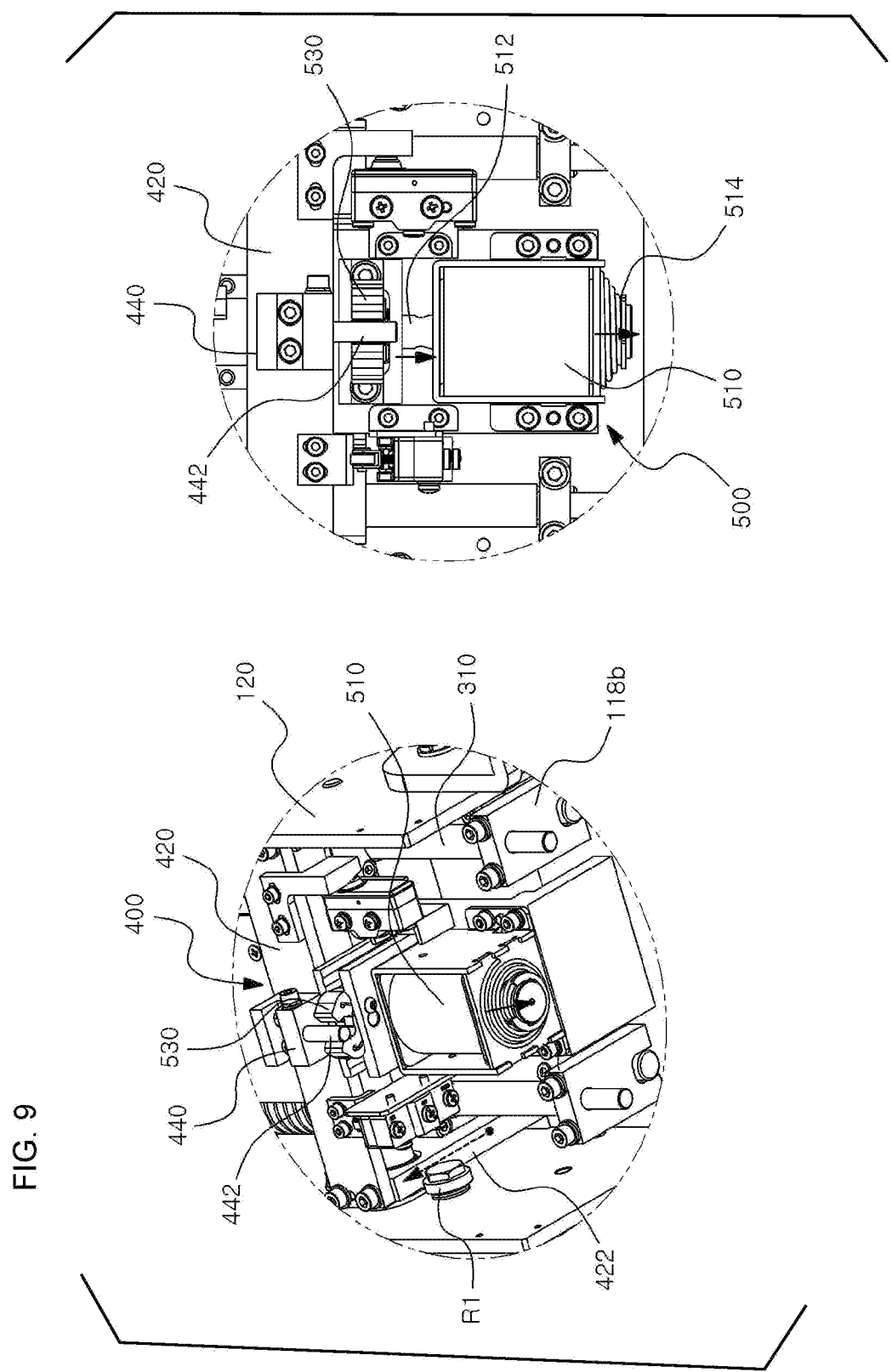
FIG. 9 is a schematic view illustrating the unlocked state of the anchor pin during the operation of the press plate of the cable-braking apparatus according to the present invention.

The objects described above, and other objects, features and advantages, will be clearly understood from the detailed explanation of the following preferred embodiments with reference to the attached drawings. Hereinafter, a cable-braking apparatus according to an embodiment of the present invention will be described in detail with reference to the accompanying drawings.

Referring to FIGS. 1 to 14, the cable-braking apparatus 10 according to an embodiment of the present invention, which is designed to press a main cable R to thus halt movement of an elevator in the event of emergency operation of the elevator, includes a main body unit 100, a drive unit 200, an elastic body compression unit 300, a press unit 400, and a movement control unit 500.

The main body unit 100 is intended to guide the installation of the drive unit 200, the elastic compression unit 300, the press unit 400, and the movement control unit 50, and is configured to have the form of a hexahedral box.

Here, the main body unit 100 includes a rear plate 110 and side plates 120, which are provided at the two opposite sides of the rear plate 110 so as to define an installation space therebetween.

The rear surface of the rear plate 110 is provided with first guide rods 114, which extend horizontally and are fitted into fitting holes 412 formed in upper and lower sides of a press plate 410 of the press unit 400 so as to guide the direction of movement of the press plate 410.

Furthermore, the first guide rods 114 are provided with the press plate 410, which is moved so as to press the main cable R between the rear surface of the rear plate 110 and the press plate 410, which faces the rear surface of the rear plate 110, and buffering elastic portions 116, which serve to prevent collision with the rear plate 110 and to automatically restore the press plate 410.

The front surface of the rear plate 110 is provided at upper right and left sides thereof with two upper supports 118a and at lower right and left sides thereof with two lower supports 118b, which hold the upper and lower ends of second guide rods 310 of the elastic compression unit 300.

The rear plate 110 is provided at upper and lower levels thereof with guides R1 and R2, to which bearings or the like are applied so as to guide the movement of the press unit 400 in the state of being in close contact with upper and lower surfaces of connecting bars 422 of the press unit 400.

Fixing frames 130, which are mounted to a cage (not shown) of the elevator, are coupled to the two side plates 120. A guide hole 132 is formed in each of the fixing frames 130 such that the angle of the two side plates 120 relative to the fixing frames 130 is changeable by virtue of rotation along the guide holes 132. If it is unnecessary to control the angle of the side plates 120, the guide holes 132 may be omitted.

The drive unit 200 is a reduction gear which is provided at an upper level of the front surface of the rear plate 110 and generates drive force to lift the elastic compression unit 300 to thus generate a force that presses the main cable R. Specifically, the drive unit 200 includes a drive motor 210, a first of first follower gear 214a, a second of first follower gear 214b, a second follower gear 216, a first follower shaft 218, a second follower shaft 220, a third follower gear 230, a third follower shaft 232, a fourth follower gear 234, a clutch 240, and a switch hinge lever 250.

Here, the first of first follower gear 214a, the second of first follower gear 214b, the second follower gear 216, the first follower shaft 218, the second follower shaft 220, the third follower gear 230, the third follower shaft 232, the fourth follower gear 234, and the clutch 240 are positioned in an additional main body 202.

The drive motor 210 is mounted to the upper portion of the main body 202 so as to provide the drive force required to generate the compressive force of a main elastic element 320. The drive motor 210 is a DC motor or an AC motor, and includes a drive gear 212 provided at the drive shaft thereof, which is a helical gear.

The first of first follower gear 214a is a helical gear engaged with the drive gear 212, and is fixed to the upper portion of the shaft. The second of first follower gear 214b, which is a spur gear, is mounted to the lower portion of the shaft so as to be rotated together with the first of first follower gear 214a.

The second follower gear 216, which is a spur gear, is engaged with the second of first follower gear 214b.

The first follower shaft 218, which is erect, is provided at the upper portion thereof with the second follower gear 216 so as to be rotated together with the second follower gear 216, and is provided at the lower portion thereof with a screw-shaped spiral gear.

The second follower shaft 220 is oriented in a direction perpendicular to the first follower shaft 218, and is provided with an interlocking gear 222 engaged with the spiral gear of the first follower shaft 218.

The third follower gear 230 is provided at the third follower shaft 232, which is positioned parallel to the second follower shaft 220.

The third follower shaft 232 is configured to have a polygonal cross-section so as to be rotatable together with the third follower gear 230 and the clutch 240.

The fourth follower gear 234 is disposed adjacent to the third follower gear 230, and is freely rotatable. The fourth follower gear 234 includes ridge-shaped protrusions, which are radially formed on the surface thereof that comes into contact with the clutch 240. Accordingly, the clutch 240 is rotated together with the fourth follower gear 234 when the ridge-shaped protrusions of the fourth follower gear 234 are engaged with the radial ridge-shaped protrusions formed on the inner surface of the clutch 240, and rotation of the clutch 240 together with the fourth follower gear 234 is halted when the engagement between the two ridge-shaped protrusions is released.

Although the power of the third follower shaft 232 is not transmitted when the third follower shaft 232 is rotated in one direction, the power of the third follower shaft 232 is transmitted in one direction when the third follower shaft 232 is rotated in the opposite direction.

Specifically, when the clutch 240, which is provided at the end of the third follower shaft 232, is rotated together with the third follower shaft 232 in the same direction as the rotational direction of the third follower shaft 232, the press plate 410 is separated from the main cable R. Meanwhile, when the clutch 240 is rotated in the direction opposite the rotational direction of the third follower shaft 232, the press plate 410 presses the main cable R.

To this end, the clutch 240 includes an inner body having sloped grooves H formed in the outer circumferential surface thereof, and an outer body, which surrounds the inner body and includes support protrusions 244, which are positioned in the grooves H such that the outer body is axially moved while being rotated.

Here, the outer body includes the radial ridge-shaped protrusions formed on the surface thereof that comes into contact with the fourth follower gear 234. Accordingly, when the engagement between the ridge-shaped protrusions of the outer body and the ridge-shaped protrusions of the fourth follower gear 234 is established or released, transmission of rotative force of the fourth follower gear 234 to the outer body is established or interrupted.

Furthermore, because the grooves H are formed so as to be inclined relative to the axis, when the support protrusions 244 are moved in one direction, the outer body is separated from the fourth follower shaft 234 while being rotated. Meanwhile, when the support protrusions 244 are moved in the opposite direction, the outer body comes into close contact with the fourth follower shaft 234 while being rotated.

The outer body includes a flange formed at the end thereof adjacent to the fourth follower gear 234, and the flange is disposed in a groove formed in a movement limiter 242 such that the horizontal moving distance of the outer body is limited by the movement limiter 242.

The switch hinge lever 250 is configured so as to perform a seesaw motion. Accordingly, when the outer body of the clutch 240 is moved, the outer body catches on one end of the switch hinge lever 250, and thus the other end of the switch hinge lever 250 pushes a push button of a sensing switch RS.

Figure 10:
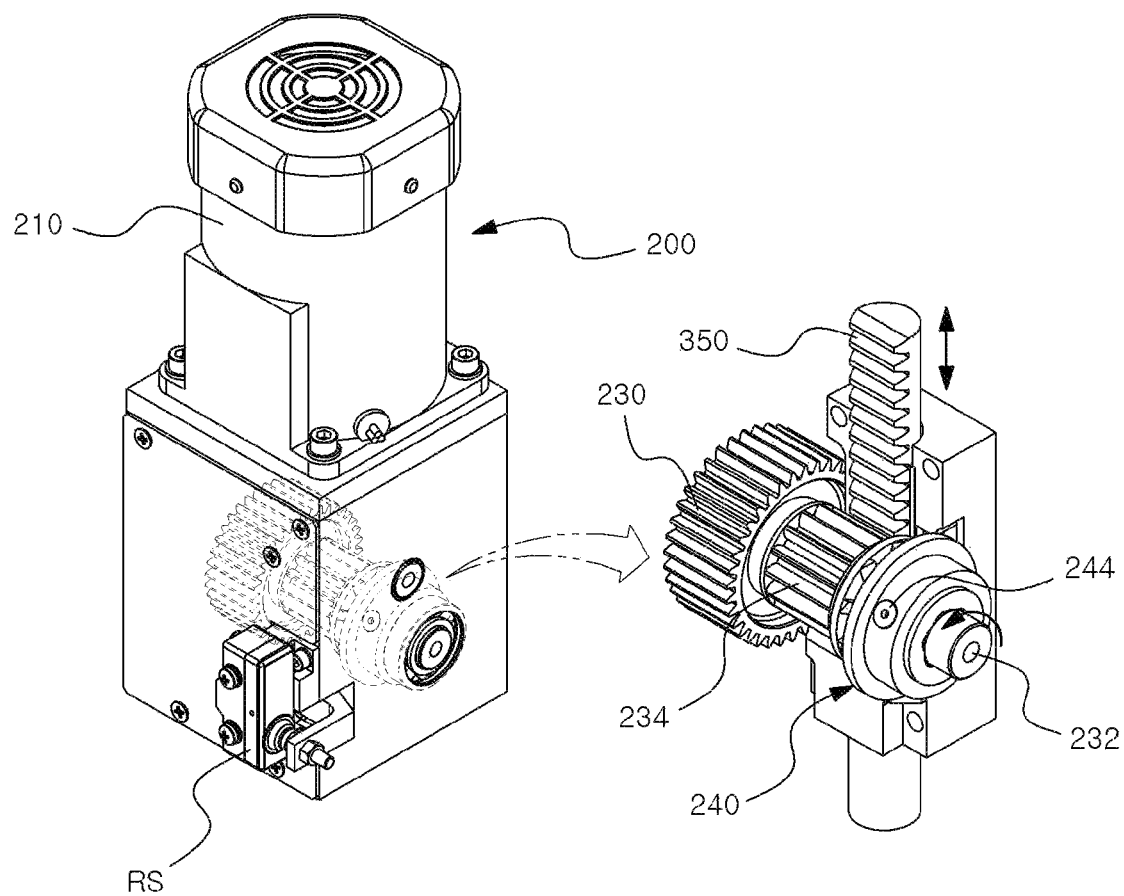
FIG. 10 is a schematic view illustrating operation of gears by the drive unit of the cable-braking apparatus according to the present invention.
Figure 11:
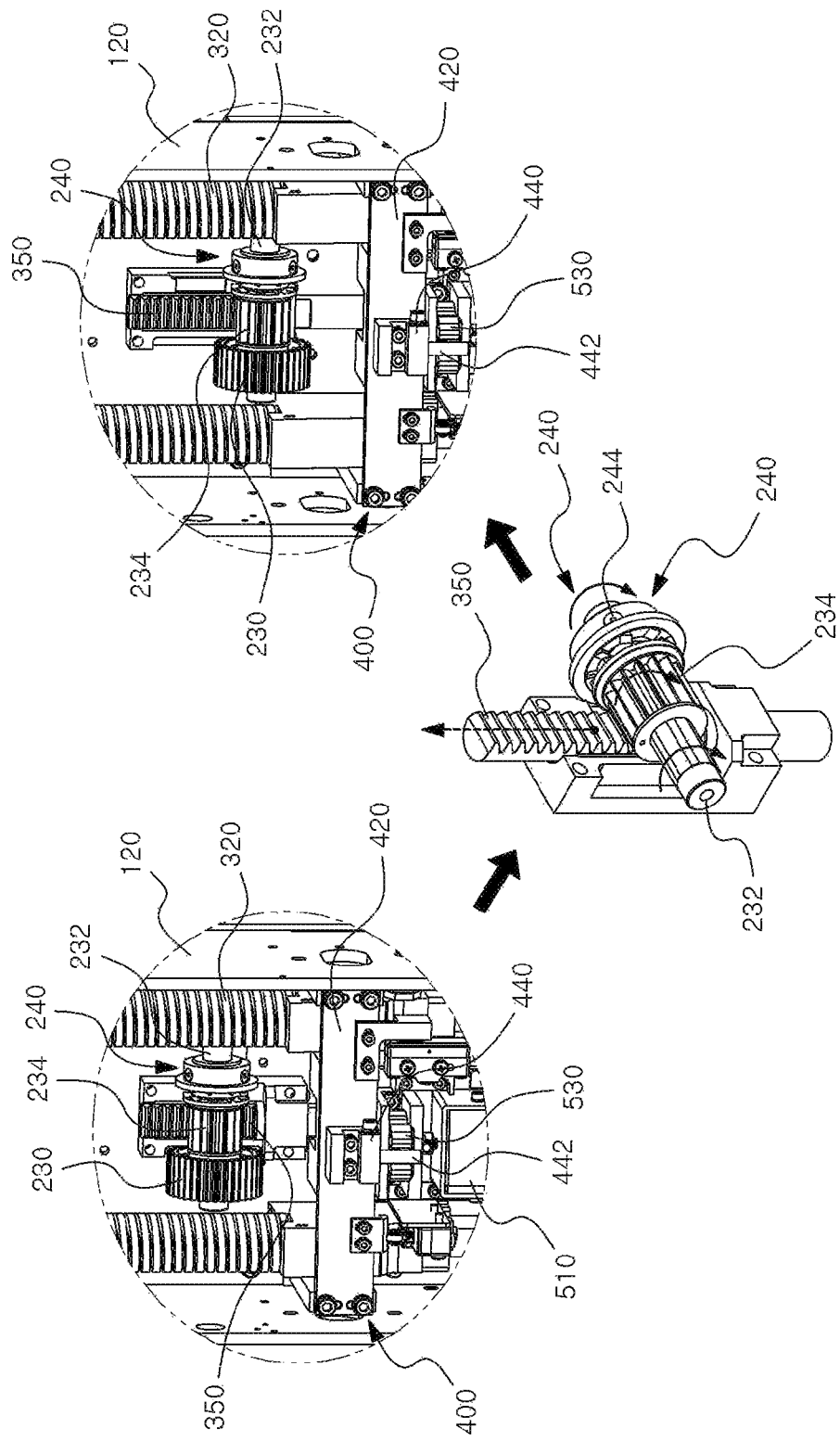
FIG. 11 is schematic view illustrating operation of the press plate and operation of gears in the opened state of the press plate by the drive unit of the cable-braking apparatus according to the present invention.

Referring to FIGS. 10 and 11, in the case in which an actuation state of the press plate 410, in which an anchor pin 442 is released from a lock 530, is converted into an open state of the press plate 410, in which the anchor pin 442 is locked in the lock 530, when the third follower shaft 232 is rotated using the power from the drive motor 210, the clutch 240 is rotated together with the third follower shaft 232, and thus the fourth follower gear 234 is rotated. Consequently, the rack 350, which is engaged with the fourth follower gear 234, is moved, thereby compressing the main elastic element 320.

Figure 12:
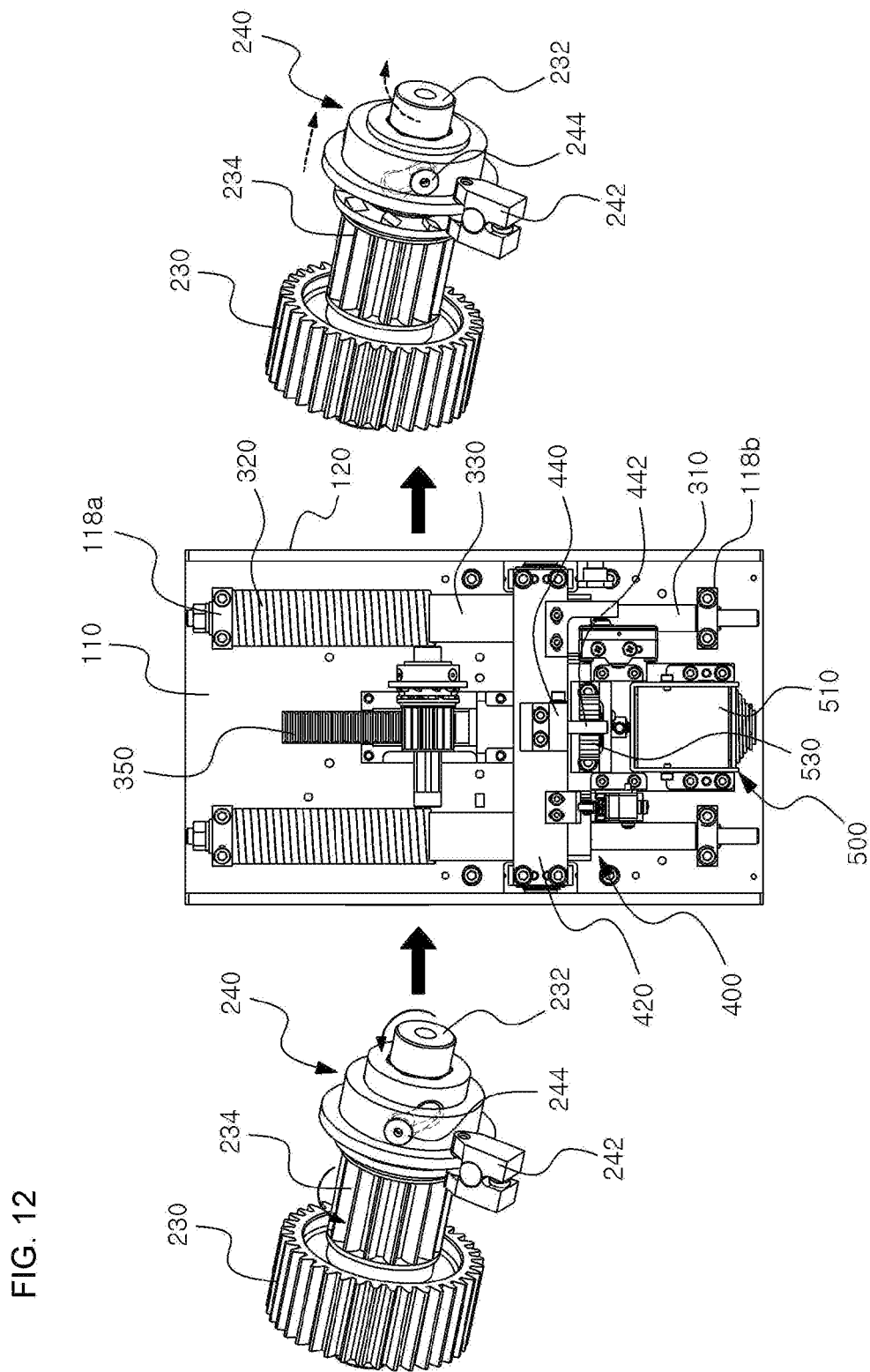
FIG. 12 is a schematic view illustrating operation of the press plate and operation of a clutch in the opened state of the press plate by the drive unit of the cable-braking apparatus according to the present invention.

The operation of the clutch 240 will now be described with reference to FIG. 12. The open state of the press plate 410 in which the anchor pin 442 is locked in the lock 530 is converted into the operation state of the press plate 410 in which the anchor pin 442 is released from the lock 530. In the open state of the press plate 410, in which the anchor pin 442 is locked in the lock 530, the third follower shaft 232 is rotated using the power from the drive motor 210, and the clutch 240 is rotated together with the third follower shaft 232, thereby rotating the fourth follower gear 234. Consequently, the rack 350, which is engaged with the fourth follower gear 234, is vertically moved upwards while compressing the main elastic element 320. At this point, the sensing switch RS is actuated, thereby generating a signal, and the drive motor 210 is deactivated, thereby stopping the compression of the main elastic element 320. When the drive motor 210 is rotated in reverse, the clutch 240 is moved away from the fourth follower gear 234, thereby interrupting the transmission of power to the fourth follower gear 234. Accordingly, the main elastic element 320 is freely restored, and the fourth follower gear 234 is reversely rotated using the restoring force of the main elastic element 320, whereby the rack 350 is vertically moved downwards and the press plate 410 is actuated.

Figure 13:
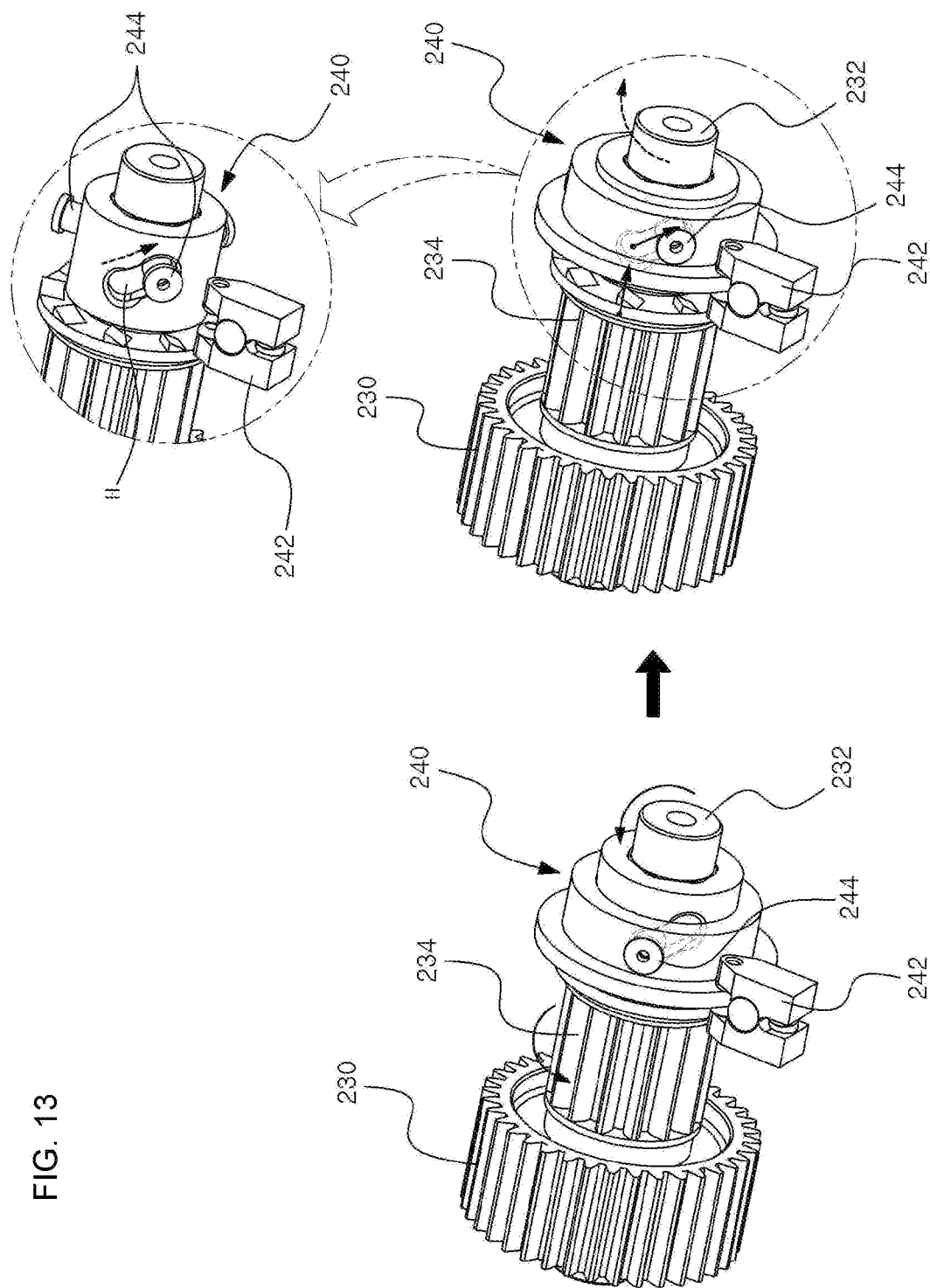
FIG. 13 is a schematic view specifically illustrating operation of the press plate and operation of the clutch in the opened state of the press plate by the drive unit of the cable-braking apparatus according to the present invention.

The operation of the clutch 240 will now be described with reference to FIGS. 13 and 14. The open state of the press plate 410 in which the anchor pin 442 is locked in the lock 530 is converted into the actuation state of the press plate 410, in which the anchor pin 442 is released from the lock 530. In the open state of the press plate 410 in which the anchor pin 442 is locked in the lock 530, the fourth follower gear 234 and the clutch 240 are rotated, and the rack 350 is vertically moved upwards, thereby compressing the main elastic element 320. In the actuation state of the press plate 410 in which the anchor pin 442 is released from the lock 530, compression of the main elastic element 320 is stopped, and the drive motor 210 is rotated in reverse, thereby reversely rotating the third follower shaft 232. When the clutch 240 is moved, the support protrusions 244 are moved in the other direction along the grooves H, and thus the fourth follower gear 234 is separated from the clutch 240, thereby releasing the transmission of power.

The operation of the clutch 240 will be described with reference to FIG. 14. When the outer body of the clutch 240 is moved, the switch hinge lever 250 is actuated, and the sensing switch RS is thus pushed, thereby generating a signal. Consequently, it is noted that the outer body of the clutch is moved relative to the inner body. Thereafter, the main elastic element 320 is released from the compressed state, and is freely restored, whereby the rack 350 is vertically moved downwards, and the press plate 410 of the press unit 400 presses the main cable R.

The elastic compression unit 300, which is configured to compress or release the main elastic element 320 using the drive force of the drive unit 200, includes the second guide rods 310, the main elastic elements 320, coupling blocks 330, a fixing block 340, and the rack 350.

The second guide rods 310 include a pair of second guide rods, which are supported by the upper supports 118a and the lower supports 118b provided on the front surface of the rear plate 110 in an erect state.

The main elastic elements 320 are fitted over the second guide rods 310 so as to press the coupling blocks 330 using the restoring force thereof.

Here, the press plate 410 of the press unit 400 releases the pressed state of the main cable R when the main elastic elements 320 are compressed by the coupling blocks 330, and presses the main cable R when the compressed state of the main elastic elements 320 is released.

The coupling blocks 330, through which the second guide blocks 310 extend, are fixed to the fixing block 340, and are moved vertically to the open position or the closed position of the press plate 410 of the press unit 400 by the main elastic elements 320.

Each of the coupling blocks 330 has a sloped surface formed on the front surface thereof and a stepped portion 332 formed in the front surface thereof under the sloped surface. The stepped portion 332 is placed on the upper end of a connecting rod 430 so as to surround a portion of the circumferential surface of the connecting rod 430.

When the stepped portion 332 is engaged with the connecting rod 430, the coupling blocks 330 are held in position, and the press plate 410 is in the state of not pushing the main cable R. When the coupling blocks 330 are moved downwards, the front sloped surfaces of the coupling blocks 330 push the connecting rod 430 to thereby move the press unit 400 forwards. At this point, the anchor pin 442 is released from the lock 530 of the movement control unit 500, and thus the press plate 410 presses the main cable R.

The fixing block 340 is fixed to the lower portions of the two coupling blocks 330 so as to collectively move the coupling blocks 330 in a vertical direction.

The rack 350 is vertically provided in the center of the upper surface of the fixing block 340, and is engaged with the fourth follower gear 234 of the drive unit 200 such that the rack 350 is moved to compress the main elastic elements 320 using the drive force of the drive unit 200.

The press unit 400 is actuated by the elastic compression unit 300 so as to move the press plate 410 forward and backwards to thus press or release the main cable R. The press unit 400 includes the press plate 410, a connecting plate 420, the connecting rod 430, and an anchor pin block 440.

The forward and backward movement of the press unit 400 is limited by the sensing switch RS, which is configured to detect the position of the press unit 400 in forward and backward directions.

The press plate 410, which is constituted as a vertically erect plate, is spaced rearwards apart from the rear plate 110 of the main body unit 100 so as to press or release the main cable R, and has fitting holes 412 into which the first guide rods 114, which are positioned at right and left sides of upper and lower sides, are fitted so as to guide the direction of movement of the press plate 410.

The connecting plate 420 is connected to the press plate 410 via the connecting bars 422, which are connected at first ends thereof to two lateral sides of the surface of the connecting plate 420 that faces the press plate 410.

Here, the connecting bars 422 extend at second ends thereof through the rear plate 110, and are fixed to two lateral sides of the rear surface of the connecting plate 420.

The connecting rod 430 is rotatably coupled to the facing surfaces of the front portions of the connecting bars 422 behind the connecting plate 420. The connecting rod 430 is engaged with the stepped portions 332 formed in the coupling blocks 330 of the elastic compression unit 300 so as to limit the compressed extent of the main elastic elements 320.

The anchor pin block 440 is provided in the center on the front surface of the connecting plate 420, and includes the anchor pin 442, which projects downwards so as to be locked in or released from the lock 530 of the movement control unit 500.

The movement control unit 500 performs control to lock or release the anchor pin 442, which is provided at the other side of the press unit 400, to thus control the movement of the press unit 400. The movement control unit 500 includes a solenoid 510, a support body 520, the lock 530, and a tension spring 550.

The solenoid 510 is positioned below the anchor pin block 440 of the press unit 400. A pin cover 512 is raised when power is applied from a separate power supply (not shown), and is lowered due to the restoring force thereof when the supply of power is interrupted. Here, the solenoid 510 is spaced forwards apart from the rear plate 110 via a support 502 provided on the front surface of the rear plate 110, and is supported by a support bracket 504 at a lower portion of the front surface of the support 502.

The solenoid 510 raises the pin cover 512, which is provided at the upper portion of the pin. When the supply of power to the solenoid 510 is interrupted, the pin is lowered to the original position by means of a restoring spring.

Because the pin cover 512 has a sloped surface, which is formed at the upper portion, which is formed so as to be stepped, the lock 530 is opened or closed depending on the extent to which the pin cover 512 enters between rotatable portions 540.

The support body 520 is configured to have a "ID" shape having a groove portion 522 formed therein when viewed from a lateral side such that the lock 530 is positioned in the groove portion 522, and has therein a mounting hole 524, which is vertically formed through the support body 520 such that the pin cover 512 is vertically movable through the mounting hole 524.

The lock 530 is disposed above the solenoid 510, and is divided into a pair of segments such that first ends of the pair of segments of the lock 530 are opened and closed when the pin cover 512 is raised and lowered.

The lock 530 is configured such that locking grooves 534 are respectively formed in the facing surfaces of the front ends of the pair of segments and grooves 536 are respectively formed in the facing surfaces of the rear ends of the pair of segments so as to allow the rotatable portions 540 to be mounted in the grooves 536. The pair of segments of the lock 530 are connected to each other via a support shaft 532 between the locking grooves 534 and the grooves 536.

Accordingly, the lock 530 locks the anchor pin 442 provided at the anchor pin block 440 by the closing actuation of the locking grooves 534, and releases the anchor pin 442 by the opening actuation of the locking grooves 534.

The rotatable portions 540 are composed of rollers, which are horizontally disposed in the grooves 536 and are supported by shafts. Accordingly, when the pin cover 512 is moved upwards, the lock 530 is opened.

The tension spring 550 is fitted at the two bent ends thereof into connecting holes 536a, which are formed in the front ends of the pair of segments of the lock 530, and is supported at the wound portion thereof by the shaft 532. Consequently, when the force applied to the lock 530 in order to open the lock 530 is released, the lock 530 is restored to the original position.

Hereinafter, setting and braking operation of the cable-braking apparatus according to the embodiment of the present invention will be described.

First, the state of the apparatus before setting is described. When the elastic compression unit 300 is lowered, the coupling block 330 pushes the connecting rod 430 to move the entire press unit 400 toward the main body unit 100, whereby the press plate 410 is brought into close contact with the rear plate 110.

Furthermore, because the press unit 400 is pushed forwards by the slopped surfaces formed on the front surfaces of the coupling blocks 330 when the coupling blocks 330 are moved downwards, the anchor pin 442 is spaced apart from the lock 530 of the control unit 500.

In this state, the drive power from the drive motor 210 is transmitted to the first follower shaft 218 via the gear train so as to drive the first follower shaft 218, the second follow shaft 220 is rotated by the first follower shaft 218, and the third follower shaft 232 is rotated by the second follower shaft 220.

At this time, the clutch 240 is rotated together with the third follower shaft 232, thereby rotating the fourth follower gear 234. Consequently, the rack 35 engaged with the fourth follower gear 234 is vertically moved upwards while compressing the main elastic elements 320.

When the coupling blocks 330 are disengaged from the connecting rod 430, the buffering elastic portions 116, which are compressed by the press plate 410, push the press plate 410 backwards. Because the entire press unit 400 is moved backwards, the connecting rod 310 is engaged with the stepped portions 332 of the coupling blocks 330.

When the press unit 400 comes into contact with the sensing switch RS while being moved backwards, the sensing switch RS transmits a power application signal to the power supply. When the power from the power supply is applied to the solenoid 510, the solenoid is magnetized, and the pin cover 512 provided at the end of the pin is raised, thereby opening the front ends of the segments of the lock 530.

At this time, the anchor pin 442 is positioned between the locking grooves 534 in the front ends of the segments of the lock 530, which have been opened while the entire press unit 400 is moved backwards. Subsequently, the front ends of the segments of the lock 530 are closed by means of the tension spring 550 so as to prevent forward movement of the anchor pin 442, thereby establishing the locked state.

In the state in which the elevator is operated while the pressed state of the main cable R is released, the main cable R is vertically moved between the press plate 410 and the rear plate 110 of the main body unit 100.

When there is a need to brake the elevator during operation thereof in an emergency state, such as during a power outage, the supply of power to the solenoid 510 is interrupted, and the solenoid is demagnetized. Accordingly, the pin cover 512 is lowered by means of the restoring spring 514, and thus the locking force of the lock 530 is released.

Furthermore, when the coupling blocks 330 are lowered by the restoring force of the main elastic elements 320, the front sloped surfaces of the coupling blocks 330 push the connecting rod 430 forwards, thereby separating the anchor pin 442 from the lock 530.

When the entire press unit 400 is moved forwards together with the press plate 410, which is positioned behind the rear plate 110, the press plate 410 comes into contact with the rear plate 110 and thus presses the main cable R, thereby blocking the movement of the main cable R and thus stopping the elevator.

Consequently, when the power is supplied to the solenoid 510 after the drive motor 210 is halted in response to the signal from the sensing switch RS, the drive motor 210 is rotated in reverse, and the clutch 240 is moved away from the fourth follower gear 234, thereby interrupting the supply of power to the fourth follower gear 234 and thus allowing the main elastic elements 320 to be free. When the supply of power to the solenoid 510 is interrupted, the fourth follower gear 234 is reversely rotated by the restoring force of the main elastic elements 320, and thus the rack 350 is vertically lowered, thereby actuating the press plate 410.

As is apparent from the above description, according to the present invention, since the locked state of the anchor pin block is released and thus the cable is pressed by the press plate in an emergency state even though a normal locked state is maintained, the locked state is maintained by dual action of the anchor pin and the connecting rod. Furthermore, since the main elastic elements are compressed and released by the action of the gear train and the clutch, there is an effect of preventing malfunctions.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:
1. A cable-braking apparatus comprising:
a main body unit at one side of which a main cable is positioned;
a drive unit, which is provided at another side of the main body unit so as to generate a drive force;
an elastic compression unit configured to compress or release main elastic elements using the drive force generated by the drive unit;
a press unit, which is actuated by the elastic compression unit so as to move a press plate, which is provided at one side of the press unit, to thus press the main cable; and
a movement control unit configured to lock or release an anchor pin, which is provided at another side of the press unit, to thus control movement of the press unit,
wherein the movement control unit includes:
a solenoid, which is positioned below an anchor pin block of the press unit and a pin cover of which is raised upon application of power and is lowered by a restoring force on interruption of the application of power;
a lock, which is disposed above the solenoid and is divided into a pair of segments, the lock being configured such that first ends of the segments are opened or closed so as to cause locking grooves, which are formed in second ends of the segments, to hold or release the anchor pin of the anchor pin block when the pin cover is raised or lowered; and
a tension spring, which is provided below the lock so as to provide the lock with restoring force.

2. A cable-braking apparatus according to claim 1, wherein the drive unit includes:
a drive motor configured to provide a rotative force in a longitudinal direction;
a follower shaft configured to convert the longitudinal rotative force from the drive motor into a crosswise rotative force via a gear train; and
a clutch provided at an end of the follower shaft, the press plate being separated from the main cable when the clutch is rotated in a same direction as a rotational direction of the follower shaft and pressing the main cable when the clutch is rotated in a direction opposite the rotational direction of the follower shaft.

3. A cable-braking apparatus according to claim 1, wherein the elastic compression unit includes:
a pair of guide rods erectly-disposed at another side of the main body unit;
the main elastic elements, which are respectively fitted over the pair of guide rods;
coupling blocks, through which the pair of guide rods respectively extend and which are respectively fixed to the main elastic elements, the coupling blocks being moved vertically to positions for opening and closing the press plate by the main elastic elements; and
a rack, which is positioned between the pair of guide rods and which is moved so as to compress the main elastic elements by the drive unit.

4. A cable-braking apparatus according to claim 1, wherein the press unit includes:
a press plate, which is positioned behind the main body unit so as to press or release the main cable;

an anchor pin block, which is spaced forwards apart from the press plate and which includes an anchor pin which is locked in or released from a lock of the movement control unit; and a connecting rod, which is rotatably provided between the anchor pin block and the press plate and which is engaged with a stepped portion formed at a coupling block of the elastic compression unit so as to limit a positional range within which the main elastic element is compressed.

* * * * *